(12) United States Patent
Ponce Portugal et al.

(10) Patent No.: US 9,552,136 B2
(45) Date of Patent: Jan. 24, 2017

(54) METHODS AND SYSTEMS FOR PROVIDING GRAPHICAL REPRESENTATIONS OF RELATIONSHIPS BETWEEN CUSTOMERS AND COMPUTING OBJECTS

(71) Applicant: Verizon Patent and Licensing Inc., Arlington, VA (US)

(72) Inventors: Paul Ponce Portugal, Plano, TX (US); Gregory Cesar Valderrama Vilca, Lima (PE)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 94 days.

(21) Appl. No.: 14/580,012

(22) Filed: Dec. 22, 2014

(65) Prior Publication Data

US 2016/0179339 A1    Jun. 23, 2016

(51) Int. Cl.
| | | |
|---|---|---|
| G06F 3/0481 | (2013.01) | |
| G06F 3/0482 | (2013.01) | |
| G06F 3/0484 | (2013.01) | |
| G06T 11/20 | (2006.01) | |
| H04L 12/24 | (2006.01) | |
| G06F 9/44 | (2006.01) | |

(52) U.S. Cl.
CPC ......... *G06F 3/04817* (2013.01); *G06F 9/4443* (2013.01); *G06T 11/206* (2013.01); *H04L 41/22* (2013.01)

(58) Field of Classification Search
CPC .. G06T 11/206; G06T 2200/24; G06F 3/0481; G06F 3/04817; G06F 3/0482; G06F 17/246; H04L 12/2458; H04L 41/22; G06Q 10/10
See application file for complete search history.

(56) References Cited

U.S. PATENT DOCUMENTS

| | | | | |
|---|---|---|---|---|
| 2002/0186664 A1* | 12/2002 | Gibson | ................... | H04L 41/12 370/254 |
| 2005/0055639 A1* | 3/2005 | Fogg | ..................... | G06Q 10/10 715/262 |
| 2006/0031203 A1* | 2/2006 | Rosenbaum | ........... | G06Q 10/10 |
| 2009/0228830 A1* | 9/2009 | Herz | ................. | G06F 17/30572 715/808 |
| 2015/0142704 A1* | 5/2015 | London | ..................... | G06N 5/04 706/11 |
| 2015/0372857 A1* | 12/2015 | Hasan | ..................... | H04L 41/08 709/220 |
| 2015/0378563 A1* | 12/2015 | Ramanathan | ......... | G06T 11/206 715/781 |
| 2015/0381515 A1* | 12/2015 | Mattson | ................ | H04L 41/145 707/609 |

(Continued)

*Primary Examiner* — Todd Buttram

(57) ABSTRACT

An exemplary method includes a computing system providing a user interface to a user, populating a listing accessible via the user interface with a set of graphical icons that represent a set of computing objects that are associated with a customer of a service provider and hosted by the service provider, detecting a selection by the user via the user interface of one or more graphical icons from the set of graphical icons populated within the listing, and providing a graphical representation of one or more relationships between the customer and one or more of the computing objects represented by the one or more selected graphical icons for presentation to the user via the user interface. Corresponding systems and methods are also described.

20 Claims, 13 Drawing Sheets

(56) References Cited

U.S. PATENT DOCUMENTS

2016/0070449 A1\* 3/2016 Christiansen ....... G06F 3/04842
 715/765
2016/0072899 A1\* 3/2016 Tung ...................... H04L 41/12
 709/223

\* cited by examiner

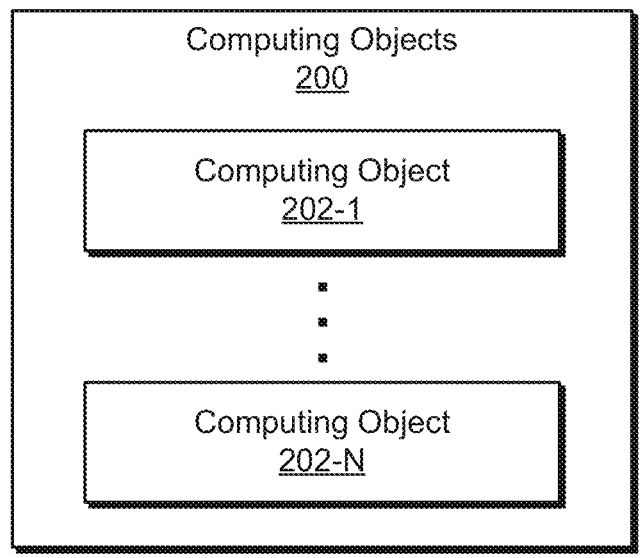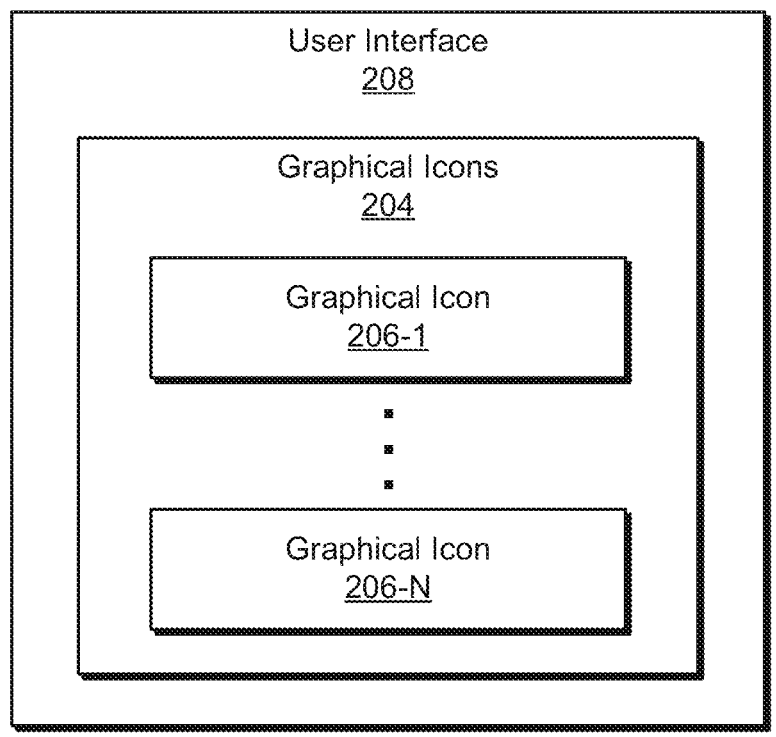
Fig. 2

US 9,552,136 B2

METHODS AND SYSTEMS FOR PROVIDING GRAPHICAL REPRESENTATIONS OF RELATIONSHIPS BETWEEN CUSTOMERS AND COMPUTING OBJECTS

BACKGROUND INFORMATION

Service providers often host physical and logical computing objects for their customers. For example, a service provider may host physical servers, cabinets, and/or chasses for certain customers. Additionally or alternatively, the service provider may host Internet Protocol (IP) networks, subnetworks, and/or Virtual Local Area Networks (VLANs) for certain customers.

Unfortunately, conventional object management and/or rendering tools may be unable to provide service providers and/or their customers with flexible graphical representations of the different relationships between the customers and their computing objects. As a result, these conventional object management and/or rendering tools may be somewhat ineffective at facilitating rapid visualization of the different relationships between the customers and their computing objects and/or rapid modification of certain operations of such computing objects.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 2 illustrates exemplary computing objects and an exemplary user interface according to principles described herein.

DETAILED DESCRIPTION OF PREFERRED EMBODIMENTS

Figure 1:
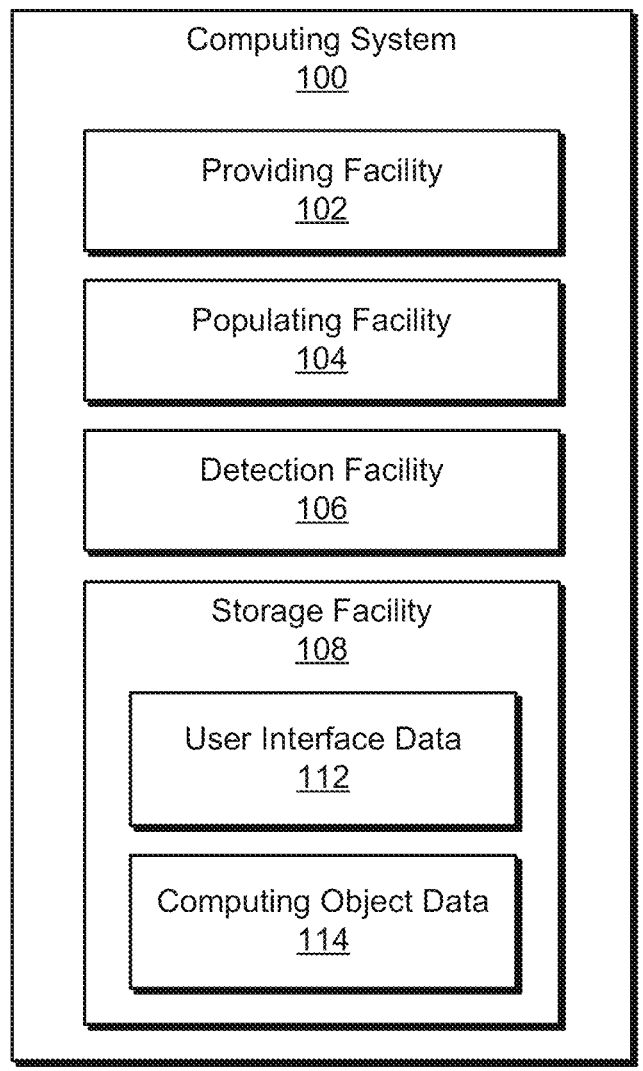
FIG. 1 illustrates an exemplary computing system according to principles described herein.

Methods and systems for providing graphical representations of relationships between customers and computing objects are disclosed. As will be described below, a computing system may provide a user interface (e.g., a web-based user interface) to a customer of a service provider. The customer may have and/or be associated with a set of computing objects (e.g., physical and/or logical computing objects) that are hosted and/or managed by the service provider. The computing system may populate a listing with a set of graphical icons that represent the set of computing objects and then enable the customer to access the listing via the user interface. Upon enabling the customer to access the listing, the computing system may detect a selection by the customer via the user interface of one or more graphical icons from the set of graphical icons. In response to detecting the customer's selection, the computing system may provide a graphical representation of one or more relationships between the customer and one or more of the computing objects represented by the one or more selected graphical icons for presentation to the customer via the user interface.

In one example, the computing system may provide a graphical representation that includes a graphical icon representative of the customer as well as the one or more selected graphical icons representative of the one or more computing objects that are associated with the customer and hosted and/or managed by the service provider. The graphical representation may also include one or more edges that graphically represent the one or more relationships between the customer and the one or more computing objects. Examples of such relationships include, but are not limited to, ownership by the customer of a computing object, creation by the customer of a computing object, utilization by the customer of a computing object, combinations of one or more of the same, and/or any other types or forms of relationships between the customer and the one or more computing objects.

Additionally or alternatively, the computing system may identify the set of computing objects that are associated with the customer and hosted by the service provider. The computing system may detect a user selection of a computing object from the set of computing objects. The computing system may then determine one or more relationships between the selected computing object and one or more other computing objects from the set of computing objects. Upon determining the one or more relationships between the selected computing object and the one or more other computing objects, the computing system may provide a graphical representation of the one or more relationships for presentation to the customer via the user interface.

As a specific example, the computing system may detect a selection by the customer of an Alternating Current (AC) outlet associated with the customer. In this example, the computing system may then identify certain relationships between the selected AC outlet and the customer's company, sub-company, project, and/or service order. For example, the computing system may determine that the selected AC outlet is owned by the customer's company, is utilized by the customer's sub-company, was created by the customer's project, and/or supplies provisions for one of the customer's service orders. Upon determining the one or more relationships between the selected computing object and the one or more other computing objects, the computing system may provide a graphical representation of those relationships for presentation to the customer via the user interface.

FIG. 1 illustrates an exemplary computing system 100 ("system 100"). The term "computing system," as used herein, generally refers to any type or form of computing device specifically configured to provide graphical representations of relationships between customers and computing objects as described herein. Although illustrated as a single entity in FIG. 1, computing system 100 may represent and/or include a plurality of computing devices operating in conjunction with one another to provide graphical representations of relationships between customers and computing objects. Examples of system 100 include, but are not limited to, one or more client devices, graphic-rendering tools, web servers, application servers, database servers, storage devices, combinations of one or more of the same, and/or any other suitable computing system.

As illustrated in FIG. 1, system 100 may include various components that facilitate providing graphical representations of relationships between customers and computing objects. For example, system 100 may include, but is not limited to, a providing facility 102, a populating facility 104, a detection facility 106, and a storage facility 108. The term "facility," as used herein, generally refers to any type or form of module and/or mechanism that facilitates and/or performs one or more computing tasks and/or processes. Facilities 102, 104, 106, and 108 may be communicatively coupled to one another by any suitable communication technology.

As will be described below, providing facility 102 may provide a user interface to a user. Populating facility 104 may populate a listing accessible via the user interface with a set of graphical icons that represent a set of computing objects that are associated with a customer of a service provider and hosted by the service provider. Detection facility 106 may detect a selection by the user via the user interface of one or more graphical icons from the set of graphical icons populated within the listing. In response to the detection of the selection by the user, providing facility 102 may provide a graphical representation of one or more relationships between the customer and one or more of the computing objects represented by the one or more selected graphical icons for presentation to the user via the user interface. Storage facility 108 may store, without limitation, user interface data 112 and/or computing object data 114 in connection with at least one service (e.g., a colocation service and/or a management service) provided to the customer of the service provider.

The term "user," as used herein, generally refers to any type or form of customer of a service provider or an administrator or engineer associated with the service provider. The term "user interface data," as used herein, generally refers to any type or form of data and/or information used to provide a user interface to a user. In one example, user interface data 112 may enable system 100 to provide a user interface (e.g., a browser and/or a web-based user interface) to a customer in connection with at least one service offered to the customer by a service provider. In another example, user interface data 112 may enable system 100 to provide a user interface (e.g., a browser and/or a web-based user interface) to an administrator or engineer in connection with at least one service offered to a customer by a service provider.

Examples of user interface data 112 include, but are not limited to, program modules, machine code, browser data, web-based user interface data, cloud-based user interface data, combinations of one or more of the same, and/or any other suitable request identifier.

The term "computing object data," as used herein, generally refers to any type or form of data and/or information representative of and/or related to one or more computing objects that are associated with a customer of a service provider and/or hosted by the service provider. In one example, computing object data 114 may be used by system 100 to provide a graphical representation of one or more relationships between a customer of a service provider and one or more computing objects that are associated with the customer and/or hosted by the service provider. Additionally or alternatively, computing object data 114 may be used by system 100 to provide a graphical representation of one or more relationships between a computing object selected by the customer and one or more other computing objects that are associated with the customer and/or hosted by the service provider.

It will be recognized that, although facilities 102, 104, 106, and 108 are shown to be separate facilities in FIG. 1, facilities 102, 104, 106, and 108 may be combined into a single facility or split into additional facilities as may serve a particular implementation. Additionally or alternatively, one or more of the facilities 102, 104, 106, and 108 may be omitted from and external to system 100 in other implementations. For example, storage facility 108 may be external to and communicatively coupled to system 100 in certain alternative implementations. Facilities 102, 104, 106, and 108 may include or be otherwise implemented by one or more computing devices configured to perform one or more of the operations described herein. In such implementations, system 100 may be referred to as a computer-implemented system 100.

In some examples, system 100 may be associated with (e.g., provided by and/or included in) a graphic-rendering tool. For example, system 100 may include and/or represent a component of a graphic-rendering tool that facilitates visualization of different relationships between a customer and the customer's computing objects. Additionally or alternatively, system 100 may include and/or represent a component of a graphic-rendering tool that facilitates modification of certain operations of the customer's computing objects.

More specifically, facilities 102, 104, 106, and 108 may individually or collectively represent at least a portion of a graphic-rendering tool. For example, facilities 102, 104, 106, and 108 may each represent a portion of a Configuration Management DataBase (CMDB) graphic-rendering tool that provides graphical representations of relationships between a customer of a service provider and computing objects that are associated with the customer and/or hosted by the service provider. In this example, the graphical representations may include certain graphical icons representative of the customer and/or one or more computing objects associated with the customer and/or hosted by the service provider. Additionally or alternatively, the graphical representations may include certain graphical icons representative of a computing object selected by the customer and/or one or more other computing objects associated with the customer and/or hosted by the service provider.

In one example, the CMDB graphic-rendering tool may facilitate three dimensional (3D) graphs in which each graphical icon represents an instance of a CMDB domain having certain attributes. In this example, the 3D graphs may illustrate relationships between the customer and computing objects that are associated with the customer and/or hosted by the service provider. Additionally or alternatively, the 3D graphs may illustrate relationships between a computing object selected by the customer and one or more other computing objects associated with the customer and/or hosted by the service provider.

In one example, the CMDB graphic-rendering tool may include and/or represent an extension of a CMDB model. In this example, the CMDB graphic-rendering tool may render the CMDB model using a HyperText Markup Language (HTML) (e.g., HTML5) and/or an application framework (e.g., MICROSOFT SILVERLIGHT). Additionally or alternatively, the CMDB graphic-rendering tool may facilitate presenting computing object data 114 to the customer and/or an administrator or engineer associated with the service provider. Moreover, the CMDB graphic-rendering tool may enable the customer, the administrator, and/or the engineer to pan and/or move any graphical representations of relationships between the customer and computing objects that are associated with the customer and/or hosted by the service provider.

In one example, system 100 may populate a listing with a set of graphical icons 204 in FIG. 2 that represent a set of computing objects 200 in FIG. 2. In this example, the set of computing objects 200 may be associated with the user and hosted by the service provider. As illustrated in FIG. 2, the set of computing objects 200 may include computing objects 202-1 through 202-N. The term "computing object," as used herein, generally refers to any type or form of physical and/or logical computing object, device, and/or service that is associated with a customer of a service provider and/or hosted by the service provider. Examples of computing objects 200 include, but are not limited to, servers, cabinets, chasses, IP networks, subnetworks, VLANs, AC breakers, AC electrical networks, AC outlets, AC poles, batteries, generators, transformers, variations of one or more of the same, combinations of one or more of the same, and/or any other suitable computing objects.

As illustrated in FIG. 2, the set of graphical icons 204 may include graphical icons 206-1 through 206-N. The term "graphical icon," as used herein, generally refers to any type or form of graphic, image, and/or text that represents a customer of a service provider or a computing object that is associated with the customer and/or hosted by the service provider. In one example, one or more of graphical icons 204 may be selectable by the user. Additionally or alternatively, one or more of graphical icons 204 may change from one form to another in response to a selection by the user.

In one example, system 100 may present and/or render one or more of graphical icons 204 to the user via a user interface 208. The term "user interface," as used herein, generally refers to any type or form of user interface that facilitates providing graphical representations of relationships between a customer of a service provider and computing objects that are associated with the customer and/or hosted by the service provider. Examples of user interface 208 include, but are not limited to, browsers, web-based user interfaces, mobile application user interfaces, variations of one or more of the same, combinations of one or more of the same, and/or any other suitable user interface.

Figure 3:
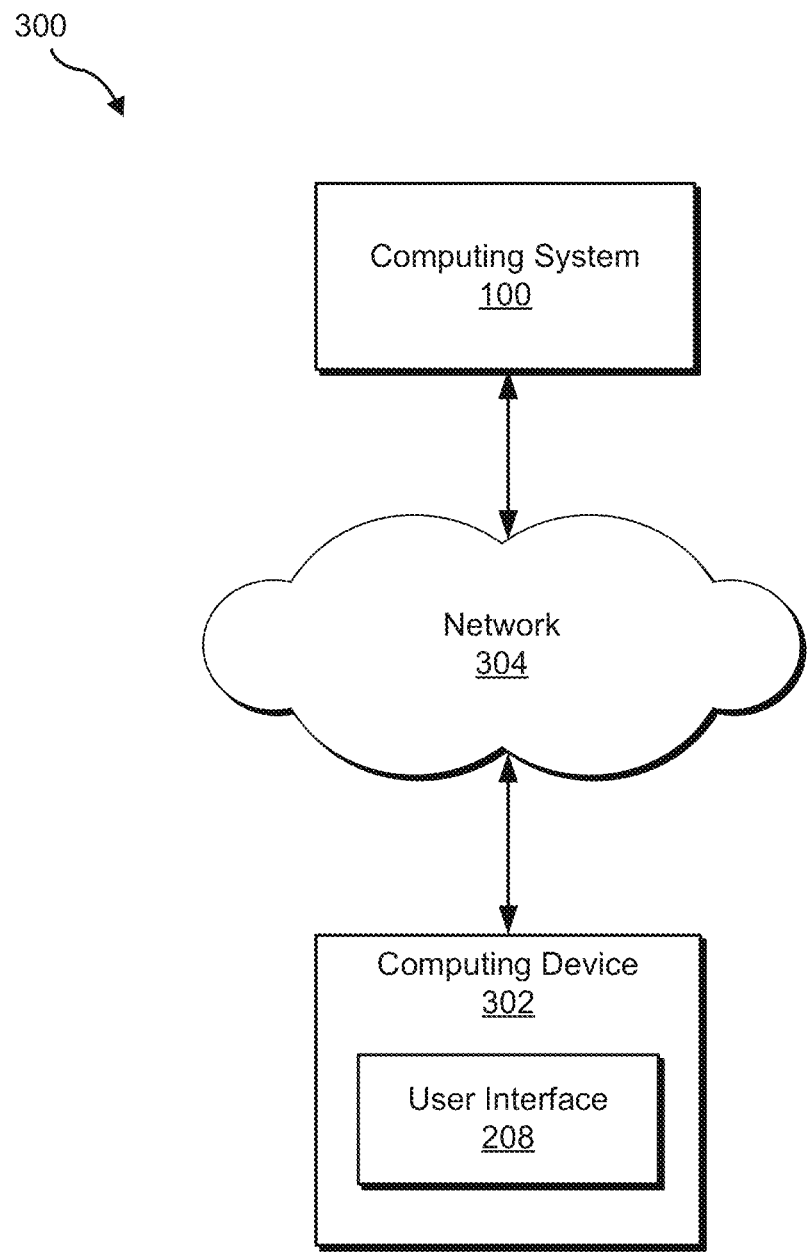
FIG. 3 illustrates an exemplary implementation in which the system of FIG. 1 may provide graphical representations of relationships between customers and computing objects according to principles described herein.

To facilitate an understanding of system 100, various implementations in which system 100 may be employed will now be described in connection with computing objects 200, graphical icons 204, and user interface 208. FIG. 3 illustrates an exemplary implementation 300 in which system 100 is associated with a network 304. Examples of network 304 include, but are not limited to, wide area networks (e.g., the Internet), local area networks, cable networks, subscriber television networks, wireless networks (Wi-Fi networks), wireless communication networks, mobile telephone networks (e.g., cellular telephone networks), closed media networks, open media networks, closed communication networks, open communication networks, combinations of one or more of the same, and/or any other suitable network.

In one example, network 304 may facilitate communication between system 100 and a computing device 302. The term "computing device," as used herein, generally refers to any type or form of computing device capable of executing computer-readable instructions. Examples of computing device 302 include, but are not limited to, one or more client devices, desktops, mobile devices, smartphones, embedded system devices, web servers, application servers, database servers, storage devices, variations of one or more of the same, combinations of one or more of the same, and/or any other suitable computing device.

System 100 may be connected to network 304 in any suitable manner. For example, system 100 may reside within network 304. Additionally or alternatively, system 100 may reside external to network 304 and/or communicate with computing device 302 by way of network 304.

Similarly, computing device 302 may be connected to network 304 in any suitable manner. For example, computing device 302 may reside within network 304. Additionally or alternatively, computing device 302 may reside external to network 304 and/or communicate with system 100 by way of network 304.

In one example, computing system 100 may represent a server and/or backend operated by the service provider. In this example, computing device 302 may represent a client device and/or frontend operated by the customer of the service provider and/or an administrator or engineer associated with the service provider. Computing system 100 may provide computing object data 114 to computing device 302 via network 304. By providing computing object data 114 to computing device 302 in this way, computing system 100 may enable computing device 302 to present and/or display graphical icons 204 representative of computing objects 200 to the customer of the service provider.

As illustrated in FIG. 3, computing device 302 may include and/or facilitate user interface 208. For example, computing device 302 may provide, execute, and/or present user interface 208 to the user. By providing, executing, and/or presenting user interface 208 in this way, computing device 302 may enable the user to visualize different relationships between the customer and the customer's computing objects and/or modify certain operations of the customer's computing objects.

Although illustrated as a separate entity in FIG. 3, system 100 may be represented and/or implemented by computing device 302. Accordingly, system 100 may provide, execute, and/or present user interface 208 to the user. Additionally or alternatively, system 100 may be represented and/or implemented by the same computing device that provides, executes, and/or presents user interface 208 to the user.

Returning to FIG. 1, system 100 may facilitate providing graphical representations of relationships between the customer and the customer's computing objects via user interface 208. To illustrate, system 100 may provide user interface data 112 to computing device 302 via network 304. Additionally or alternatively, system 100 may direct computing device 302 to provide user interface data 112 to an onboard storage facility. User interface data 112 may be provided in any suitable manner as may serve a particular implementation.

In one example, computing device 302 may submit a request for user interface data 112 to system 100. For example, the user may open a browser on computing device 302 and attempt to navigate to a web page and/or portal of the service provider via the browser. In response, computing device 302 may submit a request for user interface data 112 to system 100. System 100 may receive the request from computing device 302, and, in response, providing facility 102 may provide user interface data 112 to computing device 302. Computing device 302 may receive the user interface data 112 and present user interface 208 to the user based at least in part on the user interface data 112.

In one example, providing facility 102 may provide user interface data 112 to computing device 302 once the user has signed into a web portal associated with the service provider. For example, the user may enter his or her sign-in credentials into the web portal associated with the service provider. Upon authorization of the user's sign-in credentials, providing facility 102 may provide user interface data 112 to computing device 302. Computing device 302 may receive the user interface data 112 and present user interface 208 to the user based at least in part on the user interface data 112.

Figure 4:
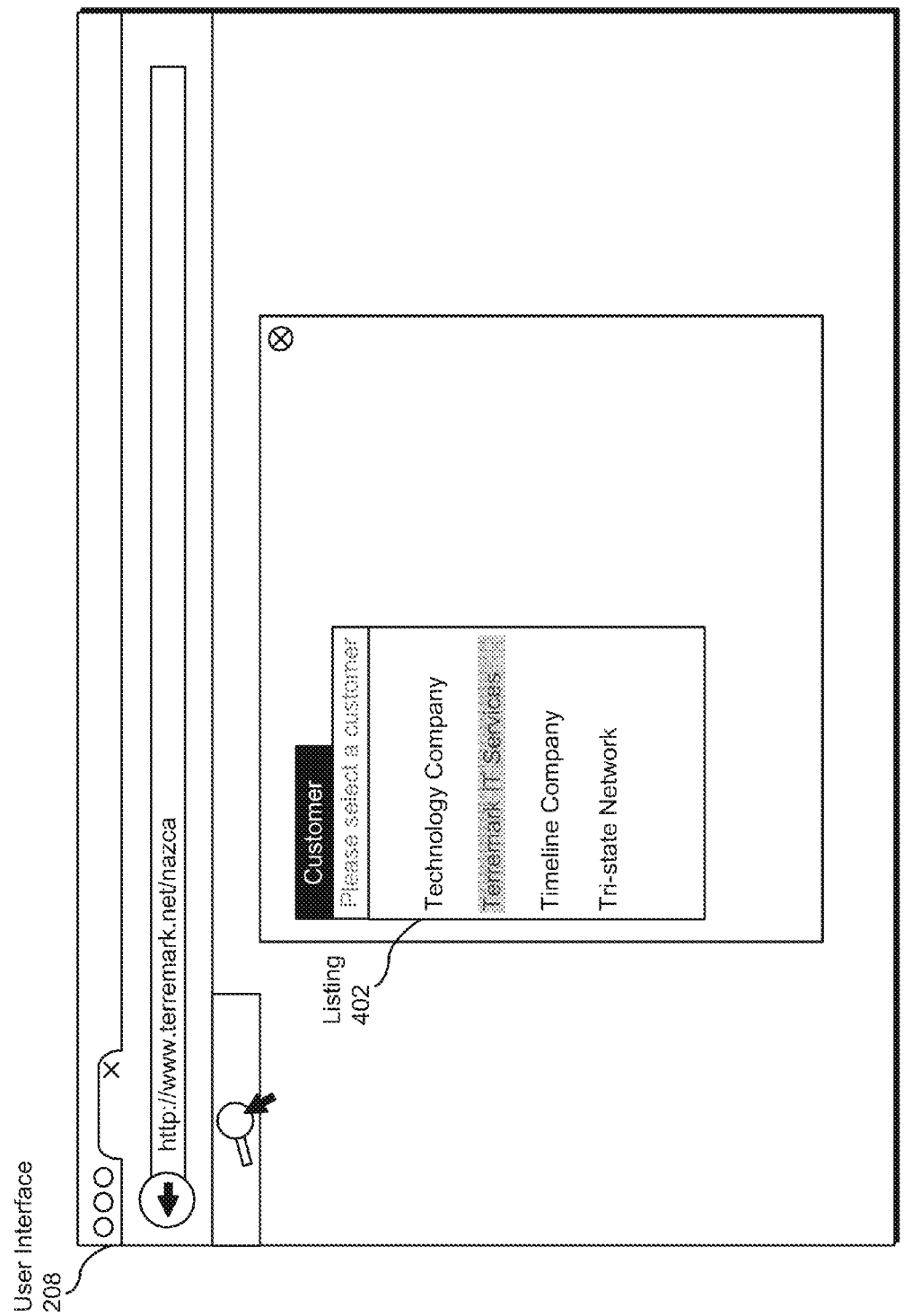
FIG. 4 illustrates an exemplary user interface that facilitates selection of graphical icons that represent customers of a service provider according to principles described herein.

In one example, populating facility 104 may populate a listing 402 in FIG. 4 with one or more of graphical icons representative of certain customers of the service provider. As illustrated in FIG. 4, listing 402 may include a set of graphical icons representative of certain customers of the service provider (in this example, "Technology Company," "Terremark IT Services," "Timeline Company," and "Tristate Network"). In this example, providing facility 102 may provide listing 402 to computing device 302 for presentation to the user via user interface 208. By providing listing 402 to computing device 302 in this way, providing facility 102 may enable the user to select a specific customer of the service provider.

In one example, detection facility 106 may detect a selection by the user of a graphical icon representative of a specific customer of the service provider from listing 402 in FIG. 4. For example, detection facility 106 may detect the user's selection of the graphical icon representative of "Terremark IT Services" from listing 402 in FIG. 4. In this example, the selection of "Terremark IT Services" may define and/or limit which graphical icons are available for inclusion in further listings populated with graphical icons 204 that graphically represent computing objects 200.

In some examples, system 100 may populate a listing accessible via user interface 208 with one or more graphical icons 204. The listing may be populated in any suitable manner as may serve a particular implementation. For example, populating facility 104 may populate the listing with one or more of graphical icons 204 based at least in part on computing object data 114. In this example, graphical icons 204 may graphically represent computing objects 200 that are associated with the customer and/or hosted by the service provider. By populating the listing in this way, populating facility 104 may enable computing device 302 to present and/or display the listing to the user. Moreover, by enabling computing device 302 to present and/or display the listing to the user, populating facility 104 may facilitate access by the user to the listing and/or selection by the user of one or more of graphical icons 204 from the listing.

Figure 5:
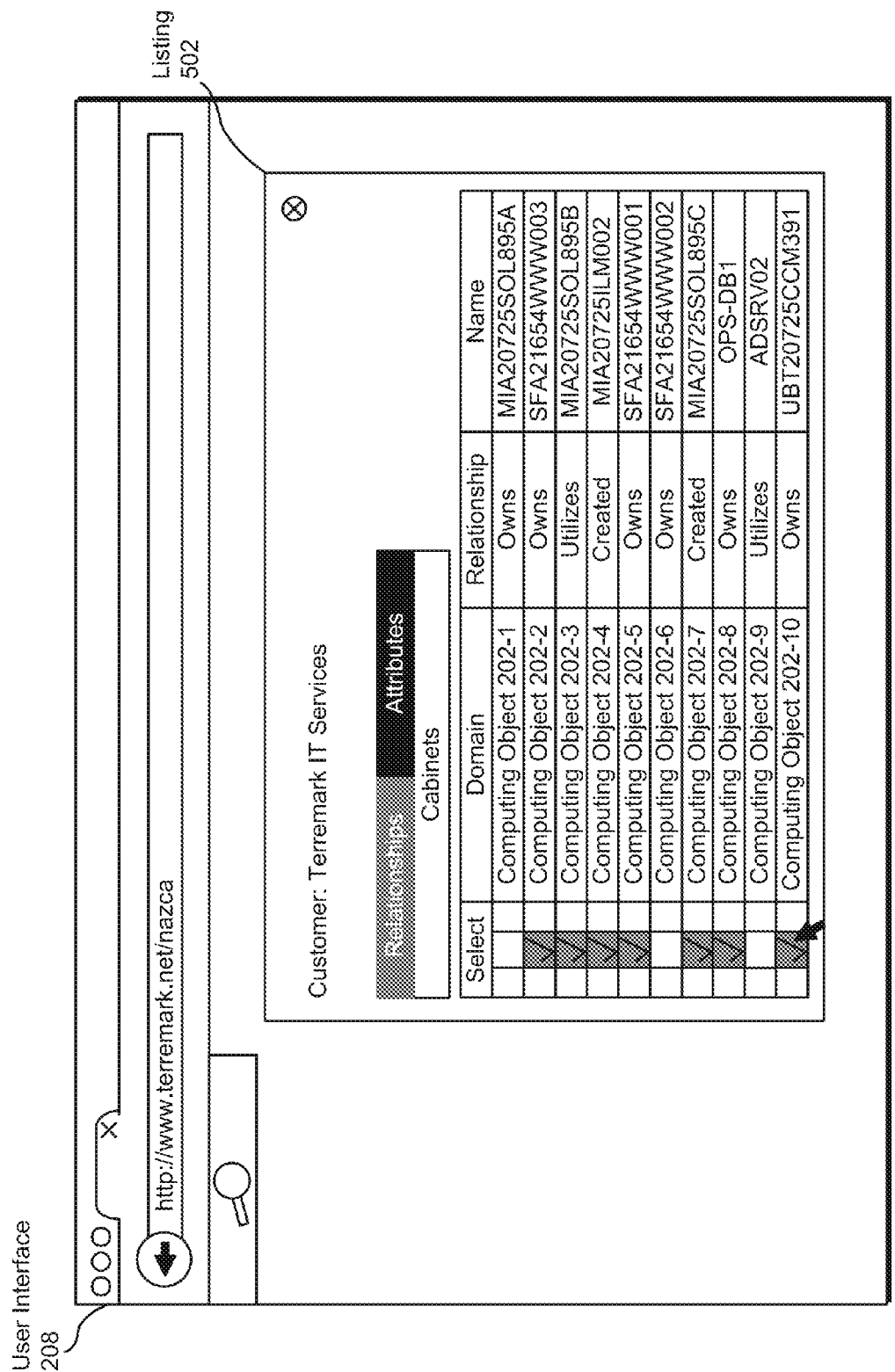
FIG. 5 illustrates an exemplary user interface that facilitates selection of graphical icons that represent computing objects associated with a customer of a service provider according to principles described herein.

As a specific example, populating facility 104 may populate a listing 502 in FIG. 5 with one or more of graphical icons 204 representative of certain computing objects associated with "Terremark IT Services." As illustrated in FIG. 5, listing 502 may include a set of graphical icons representative of certain computing objects associated with the "Terremark IT Services" (in this example, "Computing Object 202-1" through "Computing Object 202-10"), identify certain relationships between the computing objects and "Terremark IT Services" (in this example, "Owns," "Utilizes," and "Created"), and/or identify the names of the computing objects (in this example, "MIA20725SOL895A" through "UBT20725CCM391"). In this example, providing facility 102 may provide listing 502 to computing device 302 for presentation to the user via user interface 208. User interface 208 may also include one or more tools for use by the user to select one or more of the graphical icons 204 from the listing 502. The tools may enable the user to select which of the computing objects and/or relationships between the "Terremark IT Services" customer and the computing objects to include in a graphical representation for presentation to the user.

In some examples, system 100 may detect a selection by the user of one or more of graphical icons 204 populated within the listing 502. The selection may be detected in any suitable manner as may serve a particular implementation. For example, detection facility 106 may detect the selection by the user of one or more of graphical icons 204 populated within the listing 502 via user interface 208. In this example, the selection may identify which of the relationships between the customer and the customer's computing objects to include in a graphical representation for presentation to the user.

As a specific example, detection facility 106 may detect a selection by the user of various graphical icons representative of computing objects that are associated with "Terremark IT Services" from listing 502 in FIG. 5. For example, detection facility 106 may detect the user's selection of the graphical icons representative of computing objects 202-2, 202-3, 202-4, 202-5, 202-7, 202-8, and 202-10 from listing 502 in FIG. 5. In this example, the selection of these graphical icons may indicate that the user wants to include the relationships between "Terremark IT Services" and computing objects 202-2, 202-3, 202-4, 202-5, 202-7, 202-8, and 202-10 in a graphical representation for presentation to the user.

In some examples, system 100 may provide a graphical representation of one or more relationships between the customer and one or more of computing objects 200 represented by the one or more selected graphical icons for presentation to the user. The graphical representation may be provided in any suitable manner as may serve a particular implementation. For example, providing facility 102 may generate a graphical representation that depicts the one or more relationships between the customer and the one or more computing objects 200 represented by the one or more selected graphical icons. Upon generating the graphical representation, providing facility 102 may provide the graphical representation to computing device 302 for presentation to the user via user interface 208. By providing the graphical representation to computing device 302 in this way, providing facility 102 may facilitate rapid visualization of the different relationships between the customer and the customer's computing objects and/or rapid modification of certain operations of the customer's computing objects.

Figure 6:
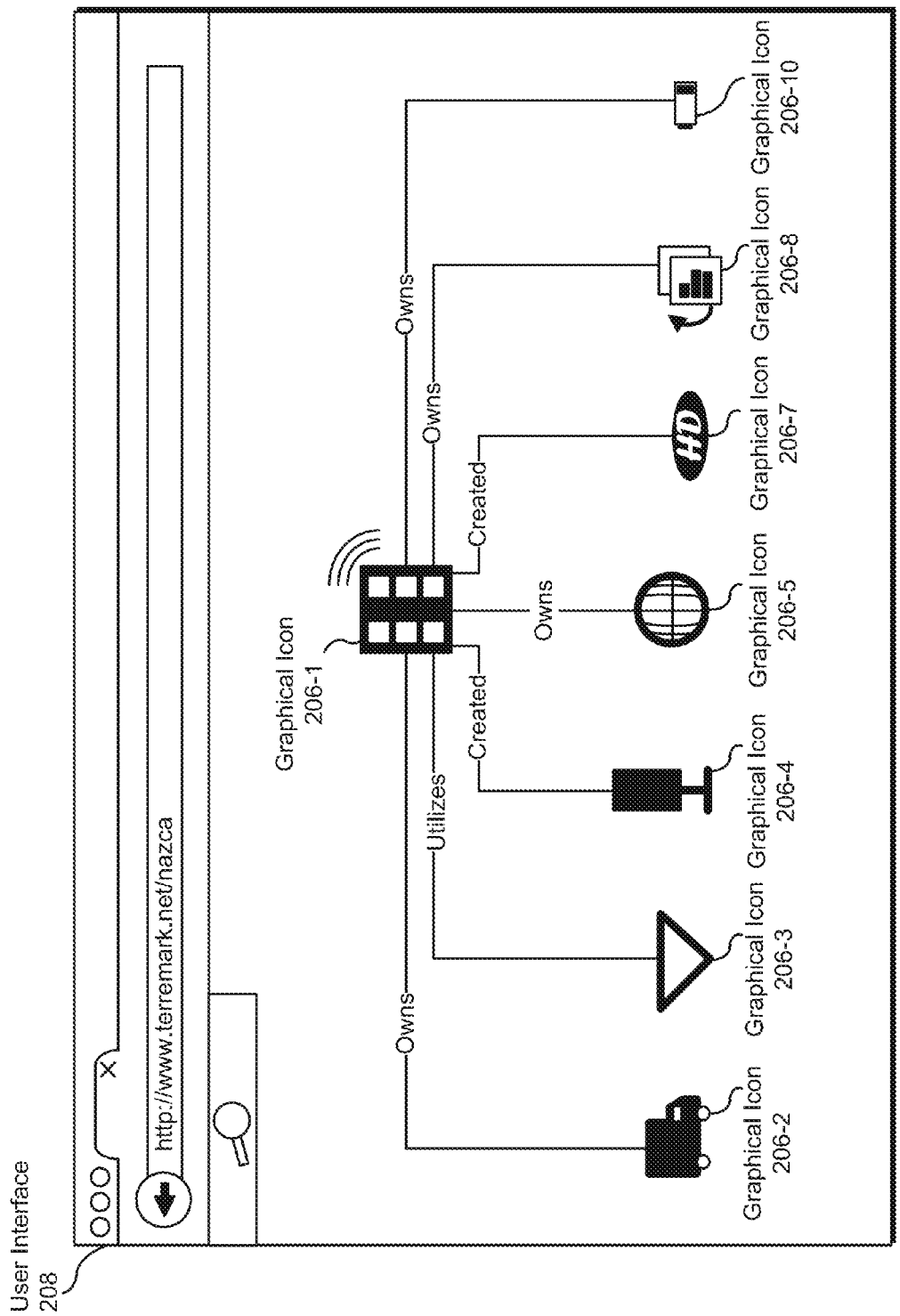
FIG. 6 illustrates an exemplary user interface providing a graphical representation of relationships between a customer and computing objects according to principles described herein.

As a specific example, providing facility 102 may provide a graphical representation of certain relationships between "Terremark IT Services" represented by graphical icon 206-1 in FIG. 6 and computing objects 202-2, 202-3, 202-4, 202-5, 202-7, 202-8, and 202-10 respectively represented by graphical icons 206-2, 206-3, 206-4, 206-5, 206-7, 206-8, and 206-10 in FIG. 6. As illustrated in FIG. 6, this graphical representation may be presented to the user via user interface 208 and may include various edges (depicted as lines connecting graphical icon 206-1 to the other graphical icons 206-2, 206-3, 206-4, 206-5, 206-7, 206-8, and 206-10 in FIG. 6) that graphically represent the relationships between "Terremark IT Services" and computing objects 202-2, 202-3, 202-4, 202-5, 202-7, 202-8, and 202-10. Moreover, this graphical representation may include various labels presented in connection with the edges. These labels may graphically specify the type of relationship between "Terremark IT Services" and computing object 202-2 (in this example, "Owns"), the type of relationship between "Terremark IT Services" and computing object 202-3 (in this example, "Utilizes"), the type of relationship between "Terremark IT Services" and computing object 202-4 (in this example, "Created"), the type of relationship between "Terremark IT Services" and computing objects 202-5 (in this example, "Owns"), the type of relationship between "Terremark IT Services" and computing object 202-7 (in this example, "Created"), the type of relationship between "Terremark IT Services" and computing objects 202-8 (in this example, "Owns"), and the type of relationship between "Terremark IT Services" and computing object 202-10 (in this example, "Owns").

In one example, detection facility 106 may detect a selection by the user of a graphical icon included in the graphical representation provided for presentation to the user. For example, detection facility 106 may detect the user's selection of graphical icon 206-4 via user interface 208 in FIG. 6. In response to the detection of the user's selection, populating facility 104 may populate another listing accessible via user interface 208 with graphical icons that represent computing objects that are associated with computing object 202-4 represented by selected graphical icon 206-4.

As a specific example, populating facility 104 may populate another listing with graphical icons that represent various physical and logical computing objects that have some type of relationship with computing object 202-4. For example, in the event that computing object 202-4 represents and/or includes a chassis that is associated with the customer and hosted by the service provider, populating facility 104 may populate the other listing with graphical icons that represent certain servers and/or cabinets that have some type of relationship with the chassis. Additionally or alternatively, populating facility 104 may populate the other listing with graphical icons that represent certain IP networks, subnetworks, and/or VLANs that have some type of relationship with the chassis.

In this example, detection facility 106 may detect the user's additional selection of one or more of the graphical icons populated within the other listing. For example, detection facility 106 may detect the user's additional selection of graphical icons that represent a server, a cabinet, an IP network, a subnetwork, and a VLAN that all have some type of relationship with the chassis. In response to the user's additional selection, providing facility 102 may generate a graphical representation of the relationships between the chassis and the selected server, the selected cabinet, the selected IP network, the selected subnetwork, and the selected VLAN. Providing facility 102 may then provide the graphical representation of these relationships for presentation to the user via user interface 208.

Although not illustrated in FIG. 6, this graphical representation may be presented to the user via user interface 208 and may include various edges that graphically represent the relationships between "Terremark IT Services" and computing objects 202-2, 202-3, 202-4, 202-5, 202-7, 202-8, and 202-10 as well as additional edges that graphically represent the relationships between computing object 202-4 and the selected server, the selected cabinet, the selected IP network, the selected subnetwork, and the selected VLAN. Moreover, this graphical representation may include various labels presented in connection with the edges. These labels may graphically specify the types of relationships between computing object 202-4 and the selected server, the selected cabinet, the selected IP network, the selected subnetwork, and the selected VLAN. For example, these labels may graphically specify that both the selected server and the selected cabinet reside in computing object 202-4. Additionally or alternatively, these labels may graphically specify that computing object 202-4 houses and/or includes one or more physical or logical devices incorporated into the selected IP network, the selected subnetwork, and the selected VLAN.

Figure 7:
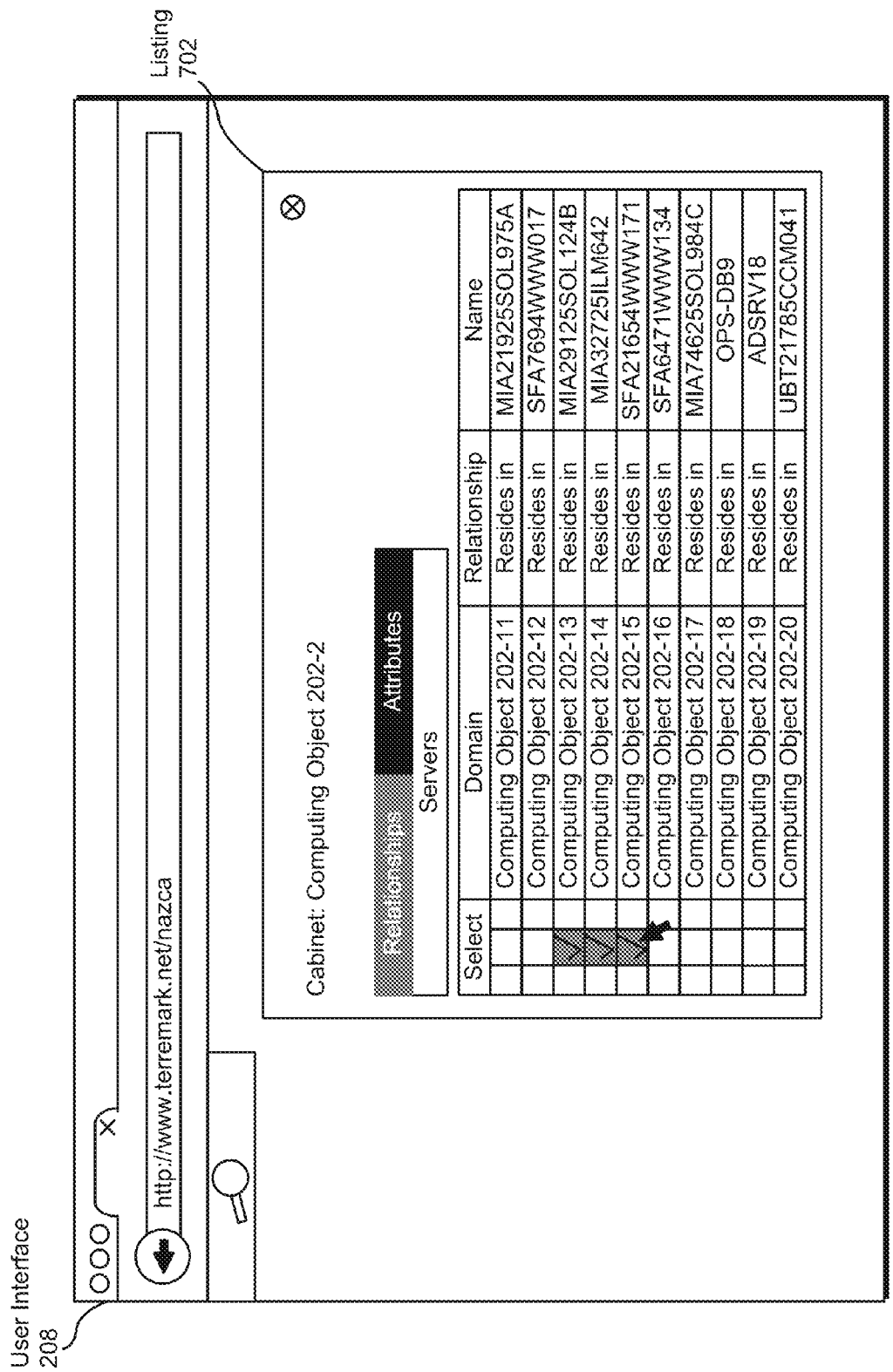
FIG. 7 illustrates an exemplary user interface that facilitates selection of graphical icons that represent computing objects associated with a customer of a service provider according to principles described herein.

As a similar example, detection facility 106 may detect the user's selection of graphical icon 206-2 via user interface 208 in FIG. 6. In response to the detection of the user's selection, populating facility 104 may populate a listing 702 in FIG. 7 with one or more of graphical icons 204 representative of certain computing objects associated with computing object 202-2. As illustrated in FIG. 7, listing 702 may include a set of graphical icons representative of certain computing objects associated with the computing object 202-2 (in this example, "Computing Object 202-11" through "Computing Object 202-20"), identify certain types of relationships between those computing objects and computing object 202-2 (in this example, "Resides in"), and/or identify the names of the computing objects (in this example, "MIA21925SOL975A" through "UBT21785CCM041"). In this example, providing facility 102 may provide listing 702 to computing device 302 for presentation to the user via user interface 208. User interface 208 may also include one or more tools for use by the user to select one or more of the graphical icons 204 from the listing 702. The tools may enable the user to select which of the computing objects and/or relationships between computing object 202-2 and the computing objects associated with computing object 202-2 to include in a graphical representation for presentation to the user.

Figure 8:
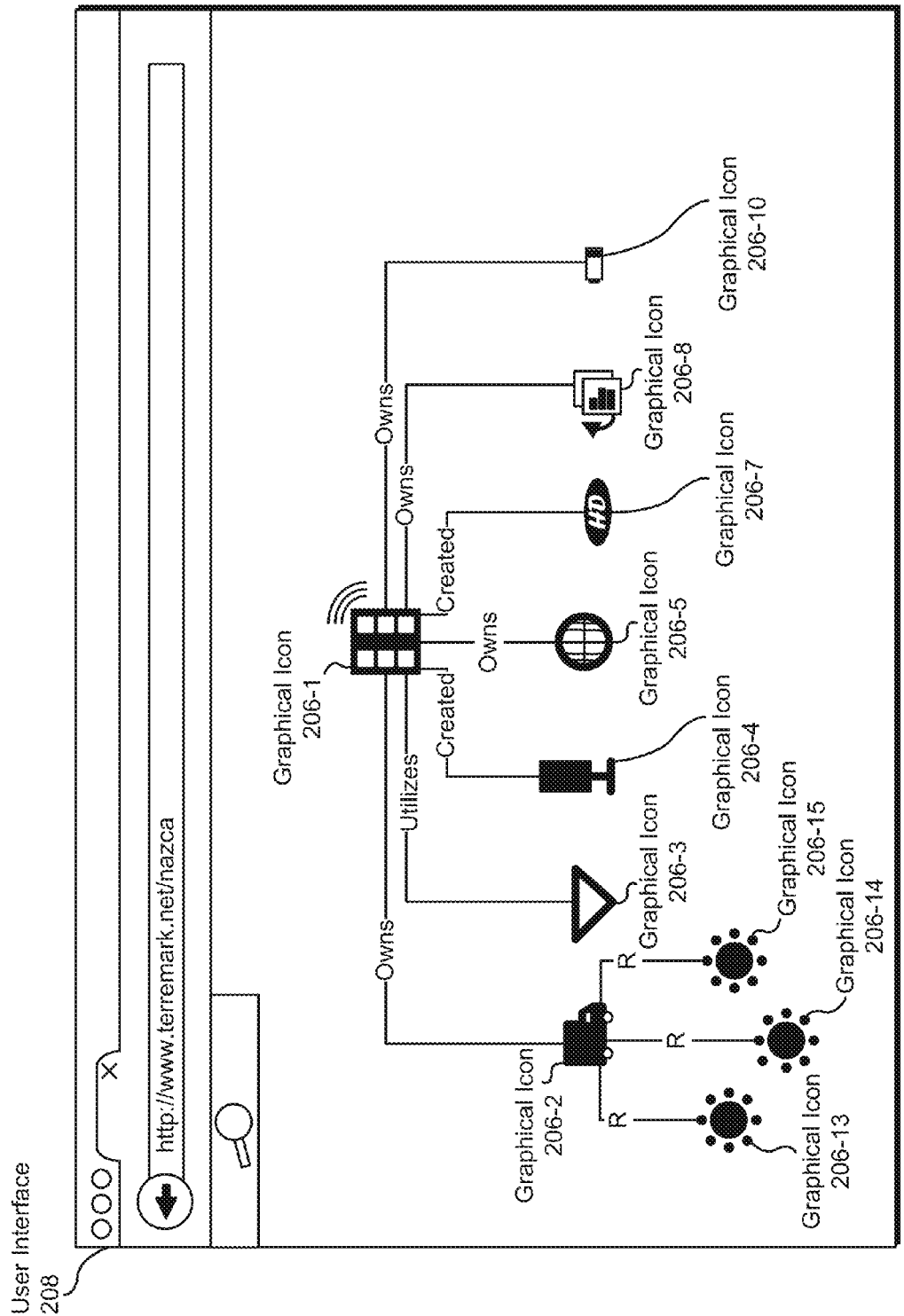
FIG. 8 illustrates an exemplary user interface providing a graphical representation of relationships between a customer and computing objects according to principles described herein.

Continuing with this example, providing facility 102 may provide a graphical representation of certain relationships between the "Terremark IT Services" customer represented by graphical icon 206-1 in FIG. 8 and computing objects 202-2, 202-3, 202-4, 202-5, 202-7, 202-8, and 202-10 respectively represented by graphical icons 206-2, 206-3, 206-4, 206-5, 206-7, 206-8, and 206-10 in FIG. 8 as well as further relationships between computing object 202-2 represented by graphical icon 206-2 in FIG. 8 and computing objects 202-13, 202-14, and 202-15 respectively represented by graphical icons 206-13, 206-14, and 206-15 in FIG. 8. As illustrated in FIG. 8, this graphical representation may be presented to the user via user interface 208 and may include various edges (depicted as lines connecting graphical icon 206-1 to the other graphical icons 206-2, 206-3, 206-4, 206-5, 206-7, 206-8, and 206-10 in FIG. 8) that graphically represent the relationships between "Terremark IT Services"

and computing objects 202-2, 202-3, 202-4, 202-5, 202-7, 202-8, and 202-10 as well as further edges (depicted as lines connecting graphical icon 206-2 to other graphical icons 206-13, 206-14, and 206-15 in FIG. 8) that graphically represent the relationships between computing object 202-2 and computing objects 202-13, 202-14, and 202-15. Moreover, this graphical representation may include various labels presented in connection with the edges. For example, some labels may graphically specify the types of relationships between computing object 202-2 and computing objects 202-13, 202-14, and 202-15 (in this example, "Resides in" as represented by the letter "R" located along each of the edges).

In one example, detection facility 106 may detect a request from the user via user interface 208 to modify at least one operation of a computing object (e.g., computing object 202-2) represented by a graphical icon (e.g., graphical icon 206-2). Examples of this operation include, but are not limited to, shutting down a computing object, turning on a computing object, establishing a relationship with a computing object, executing an action with a computing object, combinations of one or more of the same, and/or any other suitable operation. Providing facility 102 may then modify the operation of the computing object in accordance with the request.

In one example, providing facility 102 may provide a three-dimensional graphical representation of the relationships between the customer and the customer's computing objects for presentation to the user via user interface 208. In this example, detection facility 106 may detect a request from the user via user interface 208 to pan or move a view of the three-dimensional graphical representation. Providing facility 102 may then perform a pan or move operation of the view of the three-dimensional graphical representation in accordance with the request.

In some examples, system 100 may identify computing objects 200 as being associated with the customer and hosted by the service provider. Computing objects 200 may be identified in any suitable manner as may serve a particular implementation. For example, detection facility 106 may identify the customer who signed into the web portal of the service provider. Additionally or alternatively, detection facility 106 may identify the customer based at least in part on the user's selection of the graphical icon representative of the customer from listing 402 in FIG. 4. Upon identifying the customer, detection facility 106 may identify computing objects 200 as being associated with the customer.

In some examples, system 100 may detect a selection by the user of a computing object from the set of computing objects 200. The selection may be detected in any suitable manner as may serve a particular implementation. For example, detection facility 106 may detect the selection by the user of a graphical icon populated within a listing via user interface 208. In this example, the selection may identify one of computing objects 200 for inclusion in a graphical representation for presentation to the user.

In some examples, system 100 may determine one or more relationships between the selected computing object and one or more other computing objects from the set of computing objects 200. Such relationships may be determined in any suitable manner as may serve a particular implementation. For example, detection facility 106 may determine certain relationships between the selected computing object and one or more other computing objects included in the set of computing objects 200. Examples of such relationships include, but are not limited to, one computing object residing in another computing object, one logical computing object being implemented by another physical computing object, one computing object being incorporated into another computing object, variations of one or more of the same, combinations of one or more of the same, and/or any other suitable relationships between computing objects.

In some examples, system 100 may provide a graphical representation of the one or more relationships between the selected computing object and the one or more other computing objects for presentation to the user via user interface 208. The graphical representation may be provided in any suitable manner as may serve a particular implementation. For example, providing facility 102 may generate a graphical representation that depicts the one or more relationships between the selected computing object and the one or more other computing objects included in the set of computing objects 200. Upon generating the graphical representation, providing facility 102 may provide the graphical representation to computing device 302 for presentation to the user via user interface 208. By providing the graphical representation to computing device 302 in this way, providing facility 102 may facilitate rapid visualization of the different relationships between the customer's computing objects and/or rapid modification of certain operations of the customer's computing objects.

Figure 9:
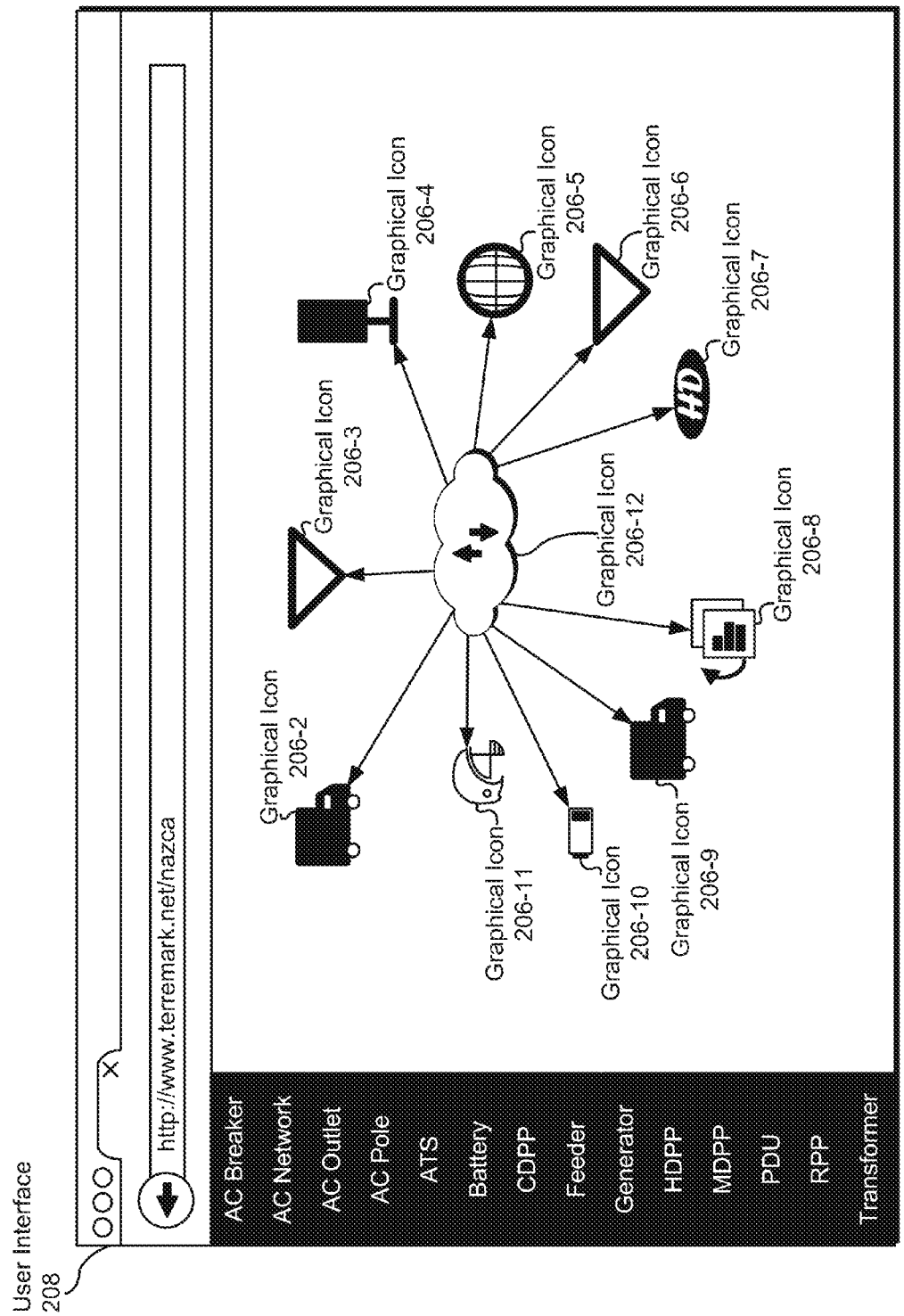
FIG. 9 illustrates an exemplary user interface providing a graphical representation of relationships between computing objects associated with a customer according to principles described herein.

As a specific example, providing facility 102 may provide a circular and/or spoke-like graphical representation of certain relationships between a selected computing object represented by graphical icon 206-12 in FIG. 9 and other computing objects represented by graphical icons 206-2 through 206-11 in FIG. 9. As illustrated in FIG. 9, this circular and/or spoke-like graphical representation may be presented to the user via user interface 208 and may include various edges (depicted as lines connecting graphical icon 206-12 to the other graphical icons 206-2 through 206-11 in FIG. 9) that graphically represent the relationships between the selected computing object represented by graphical icon 206-12 and the other computing objects represented by graphical icons 206-2 through 206-11.

In one example, detection facility 106 may detect a selection by the user of a graphical icon included in the graphical representation provided for presentation to the user. For example, detection facility 106 may detect the user's selection of graphical icon 206-12 via user interface 208 in FIG. 9. In response to the detection of the user's selection, populating facility 104 may populate another listing accessible via user interface 208 with graphical icons that represent attributes of a computing object 202-12 represented by selected graphical icon 206-12. Providing facility 102 may then provide a graphical representation of the listing populated with the graphical icons that represent the attributes of the computing object 202-12 for presentation to the user via user interface 208.

Figure 10:
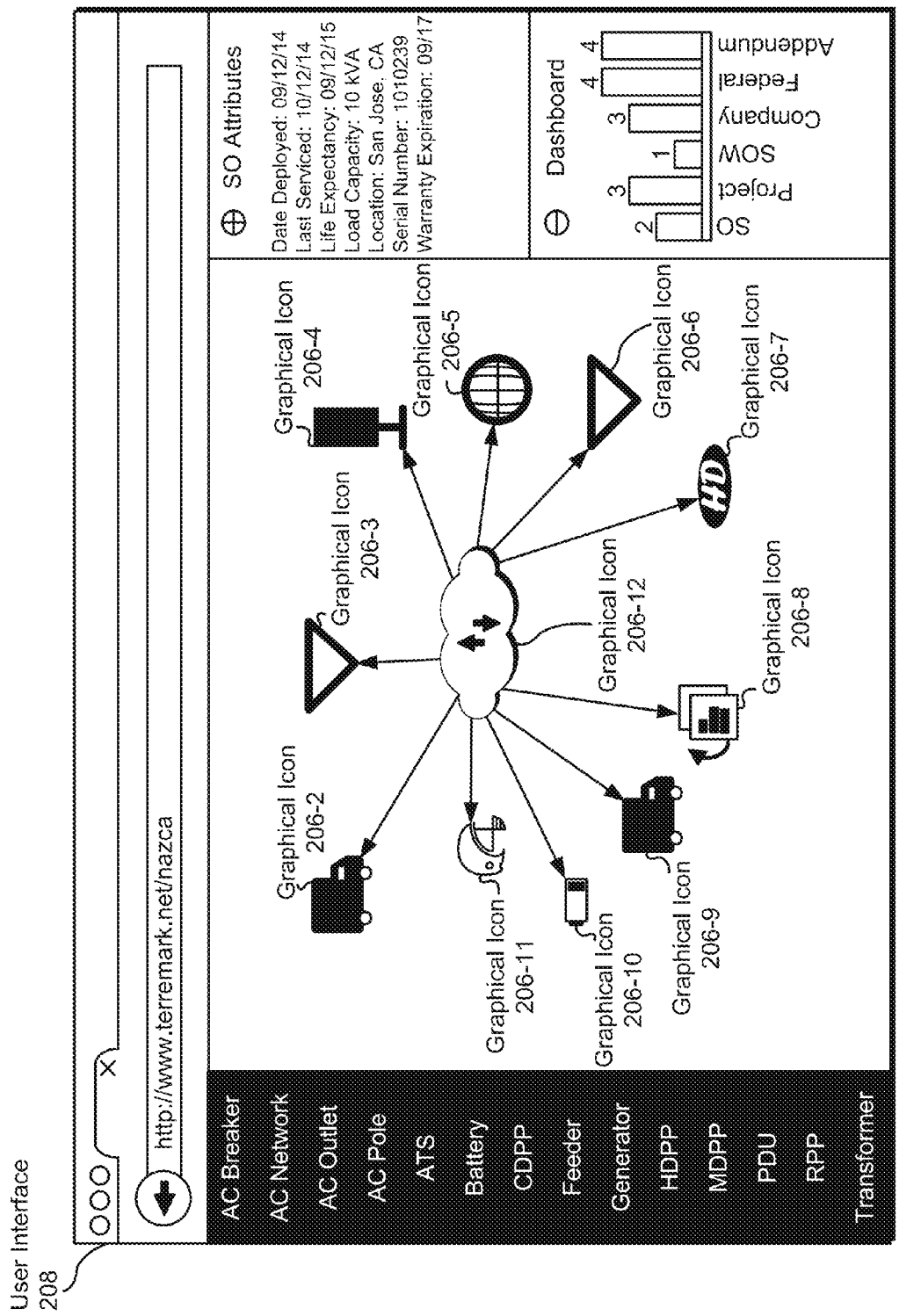
FIG. 10 illustrates an exemplary user interface providing a graphical representation of relationships between computing objects associated with a customer according to principles described herein.

As a specific example, providing facility 102 may provide a graphical representation of the listing populated with the graphical icons that represent the attributes of computing object 202-12 for presentation to the user via user interface 208 in FIG. 10. As illustrated in FIG. 10, this graphical representation may be presented to the user via user interface 208 and may include various edges (depicted as lines connecting graphical icon 206-12 to the other graphical icons 206-2 through 206-11 in FIG. 10) that graphically represent the relationships between the selected computing object represented by graphical icon 206-12 and the other computing objects represented by graphical icons 206-1 through 206-11. Additionally or alternatively, this graphical representation may include a listing (in this example, "SO Attributes") of graphical icons that represent attributes of computing object 202-12 (in this example, "Date Deployed: 09/12/14," "Last Serviced: 10/12/14," "Life Expectancy: 09/12/15," "Load Capacity: 10 kVA," "Location: San Jose, Calif.," "Serial Number: 1010239," and "Warranty Expiration: 09/17"). Moreover, this graphical representation may include a graph or chart (in this example, "Dashboard") that identifies certain computing objects that have a relationship with computing object 202-12.

In one example, a service provider may provide a colocation service for a customer. The term "colocation service," as used herein, generally refers to any type or form of service by which a customer is able to rent and/or use certain equipment, storage, and/or bandwidth offered by a service provider and/or maintained at a physical site associated with the service provider. In this example, the customer may attempt to access information about one or more computing objects associated with the customer and/or hosted by the service provider via the colocation service.

As a specific example, the customer may sign into a web portal associated with the colocation service provided by the service provider. Upon signing into the web portal, the customer may access a listing of graphical icons that represent certain physical computing objects associated with the customer, such as chasses, cabinets, and/or servers hosted by the service provider via the colocation service. The customer may then select one or more of the graphical icons representing the customer's chasses, cabinets, and/or servers via the web portal. In response to the customer's selection, providing module 102 may provide a graphical representation of the relationships between the customer and the selected chasses, cabinets, and/or servers for presentation to the customer via the web portal.

Continuing with this example, the customer may select a graphical icon representative of one of the chasses, cabinets, and/or servers included in the graphical representation. As a result of the customer's selection, the customer may access another listing of graphical icons that represent certain logical computing objects associated with the selected graphical icon, such as IP networks, subnetworks, and/or VLANs hosted by the service provider via the colocation service. The customer may then select one or more of the graphical icons representing the customer's IP networks, subnetworks, and/or VLANs via the web portal. In response to the customer's selection, providing module 102 may provide another graphical representation of the relationships between the customer, the selected chasses, cabinets, servers, IP networks, subnetworks, and/or VLANs for presentation to the customer via the web portal.

Figure 11:
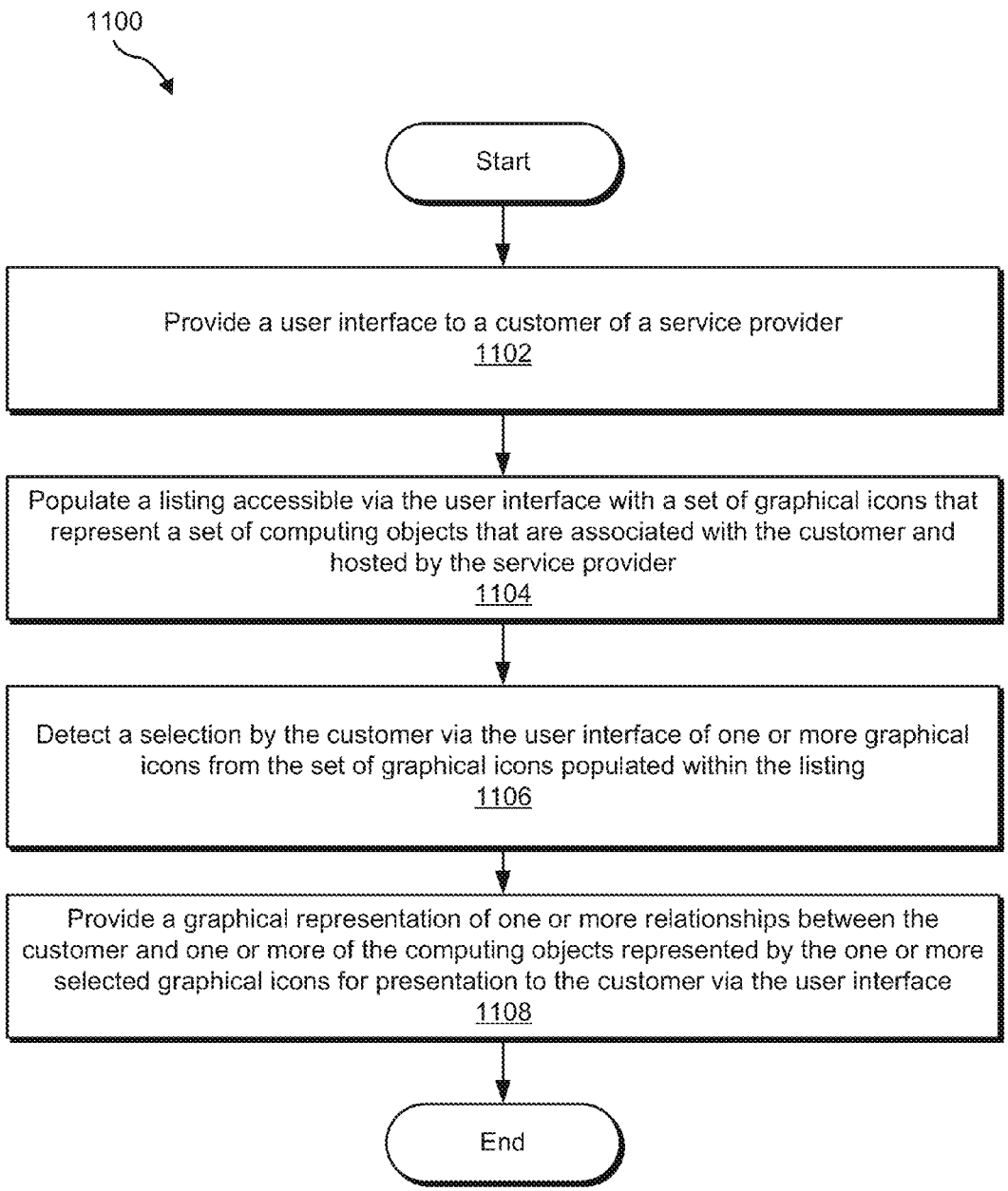
FIG. 11 illustrates an exemplary method according to principles described herein.

FIG. 11 illustrates an exemplary method 1100 of providing graphical representations of relationships between customers and computing objects. While FIG. 11 illustrates exemplary steps according to one embodiment, other embodiments may omit, add to, reorder, and/or modify any of the steps shown in FIG. 11. One or more of the steps shown in FIG. 11 may be performed by system 100 and/or any implementation thereof.

In step 1102, a computing system provides a user interface to a user. This may be performed in any of the ways described herein. For example, the computing system may provide the user interface to a computing device operated by the user via a network. Additionally or alternatively, the computing system may direct the computing device operated by the user to present the user interface based at least in part on user interface data stored in an onboard storage facility.

In step 1104, the computing system populates a listing accessible via the user interface with a set of graphical icons that represent a set of computing objects that are associated with a customer of a service provider and hosted by the service provider. This may be performed in any of the ways described herein. For example, the computing system may populate the listing and then provide the listing to the computing device operated by the user via the network. Additionally or alternatively, the computing system may direct the computing device operated by the user to populate the listing and then provide the listing for presentation to the user.

In step 1106, the computing system detects a selection by the user via the user interface of one or more graphical icons from the set of graphical icons populated within the listing. This may be performed in any of the ways described herein. For example, the computing system may detect the selection by the user by receiving user input from the computing device operated by the user via the network and then identifying the user's selection based at least in part on the user input. Additionally or alternatively, the computing device operated by the user may identify the user's selection and then notify the computing system of the user's selection via the network.

In step 1108, the computing system provides a graphical representation of one or more relationships between the customer and one or more of the computing objects represented by the one or more selected graphical icons for presentation to the user via the user interface. This may be performed in any of the ways described herein. For example, the computing system may provide the graphical representation to the computing device operated by the user via the network. Additionally or alternatively, the computing system may direct the computing device operated by the user to present the graphical representation for presentation to the user via the user interface.

Figure 12:
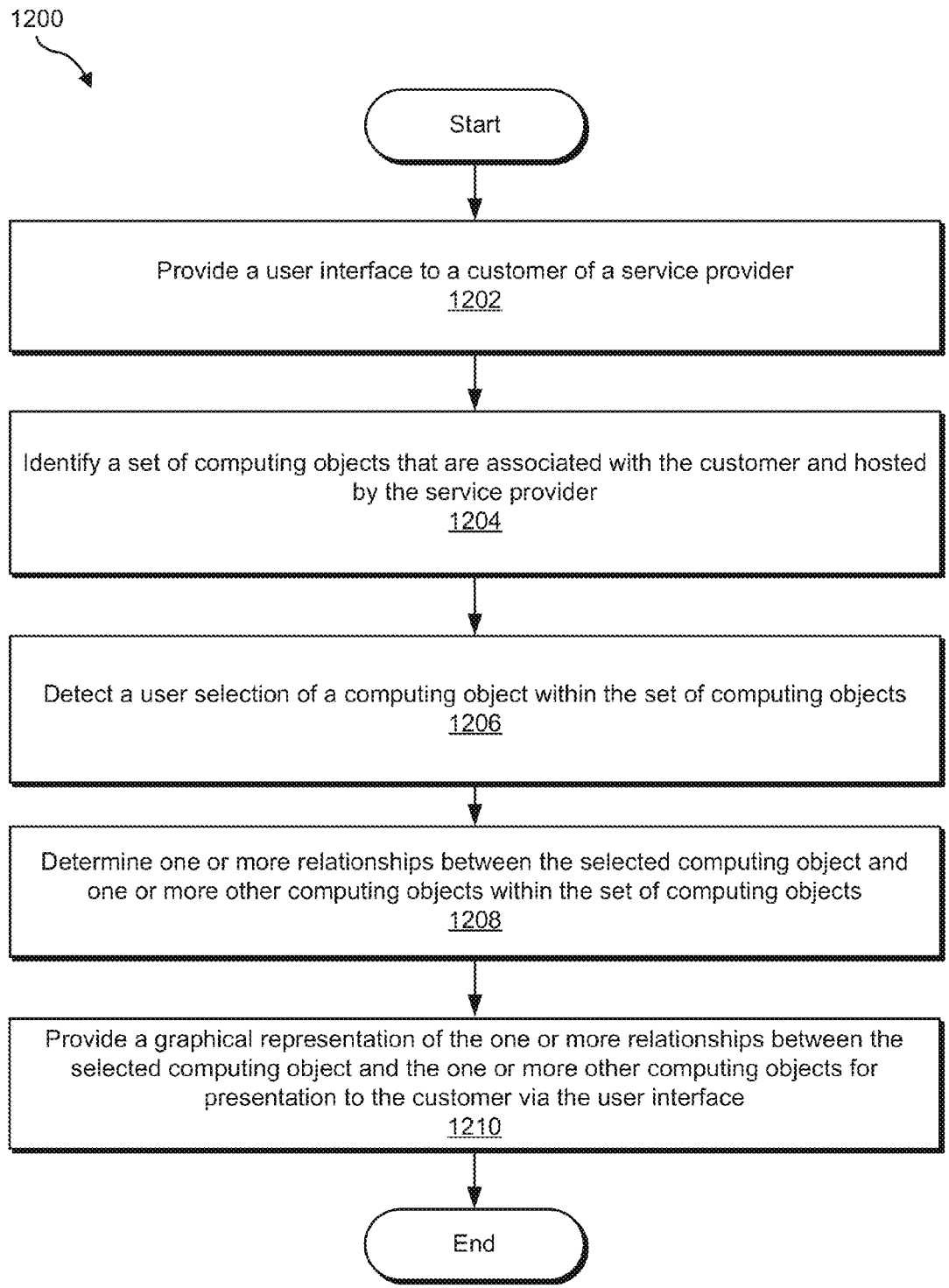
FIG. 12 illustrates another exemplary method according to principles described herein.

FIG. 12 illustrates another exemplary method 1200 of providing graphical representations of relationships between customers and computing objects. While FIG. 12 illustrates exemplary steps according to one embodiment, other embodiments may omit, add to, reorder, and/or modify any of the steps shown in FIG. 12. One or more of the steps shown in FIG. 12 may be performed by system 100 and/or any implementation thereof.

In step 1202, a computing system provides a user interface to a user. This may be performed in any of the ways described herein. For example, the computing system may provide the user interface to a computing device operated by the user via a network. Additionally or alternatively, the computing system may direct the computing device operated by the user to present the user interface based at least in part on user interface data stored in an onboard storage facility.

In step 1204, the computing system identifies a set of computing objects that are associated with a customer of a service provider and hosted by the service provider. This may be performed in any of the ways described herein. For example, the computing system may identify a set of computing objects that are associated with the customer of the service provider and hosted by the service provider. Additionally or alternatively, the computing system may direct the computing device operated by the user to identify the set of computing objects that are associated with the customer of the service provider and hosted by the service provider.

In step 1206, the computing system detects a user selection of a computing object from the set of computing objects. This may be performed in any of the ways described herein. For example, the computing system may detect the user selection by receiving user input from the computing device operated by the user via the network and then identifying the user selection based at least in part on the user input. Additionally or alternatively, the computing device operated by the user may identify the user selection and then notify the computing system of the user selection via the network.

In step 1208, the computing system determines one or more relationships between the selected computing object and one or more other computing objects from the set of computing objects. This may be performed in any of the ways described herein. For example, the computing system may determine the one or more relationships between the selected computing object the one or more other computing objects based at least in part on computing object data. Additionally or alternatively, the computing device operated by the user may determine the one or more relationships between the selected computing object the one or more other computing objects based at least in part on computing object data and then notify the computing system of the one or more relationships via the network.

In step 1210, the computing system provides a graphical representation of the one or more relationships between the selected computing object and the one or more other computing objects for presentation to the user via the user interface. This may be performed in any of the ways described herein. For example, the computing system may provide the graphical representation to the computing device operated by the user via the network. Additionally or alternatively, the computing system may direct the computing device operated by the user to present the graphical representation for presentation to the user via the user interface. This graphical representation may include a graphical icon representative of the selected computing object, one or more graphical icons representative of the one or more other computing objects, and one or more edges that graphically represent the one or more relationships between the selected computing object and the one or more other computing objects.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 13:
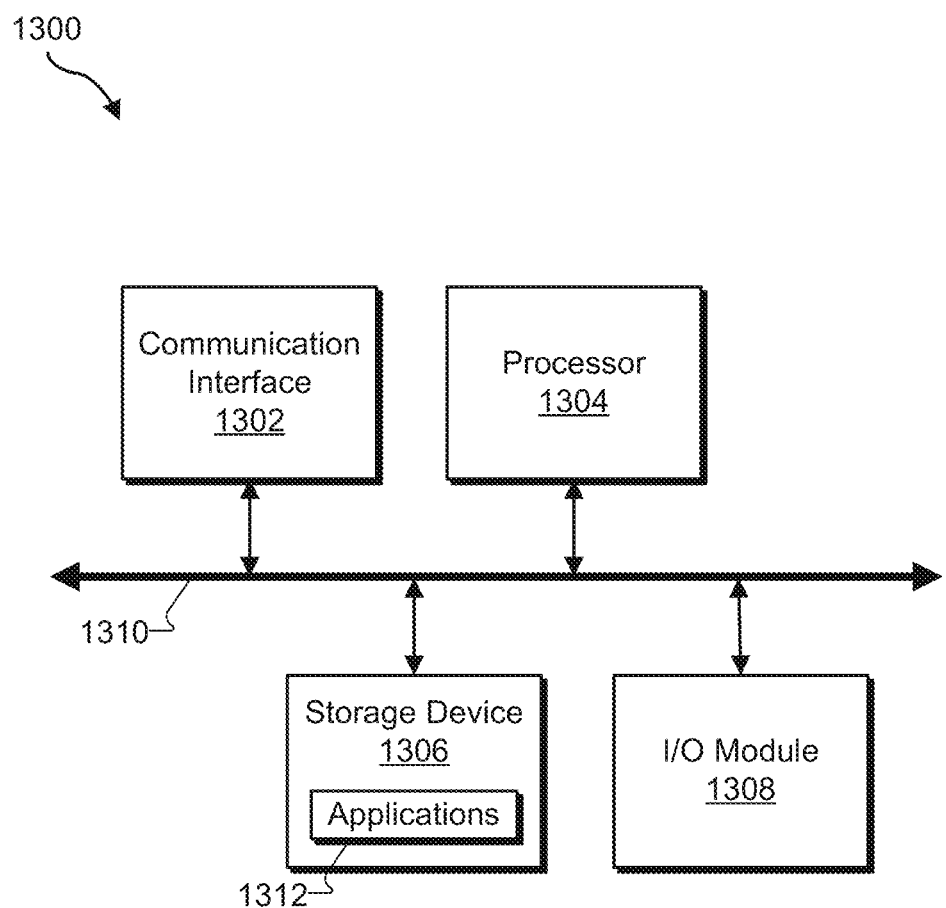
FIG. 13 illustrates an exemplary computing device according to principles described herein.

FIG. 13 illustrates an exemplary computing device 1300 that may be configured to perform one or more of the processes described herein. As shown in FIG. 13, computing device 1300 may include a communication interface 1302, a processor 1304, a storage device 1306, and an input/output ("I/O") module 1308 communicatively connected via a communication infrastructure 1310. While an exemplary computing device 1300 is shown in FIG. 13, the components illustrated in FIG. 13 are not intended to be limiting. Additional or alternative components may be used in other embodiments. Components of computing device 1300 shown in FIG. 13 will now be described in additional detail.

Communication interface 1302 may be configured to communicate with one or more computing devices. Examples of communication interface 1302 include, without limitation, a wired network interface (such as a network interface card), a wireless network interface (such as a wireless network interface card), a modem, an audio/video connection, and any other suitable interface.

Processor 1304 generally represents any type or form of processing unit capable of processing data or interpreting, executing, and/or directing execution of one or more of the instructions, processes, and/or operations described herein. Processor 1304 may direct execution of operations in accordance with one or more applications 1312 or other computer-executable instructions such as may be stored in storage device 1306 or another computer-readable medium.

Storage device 1306 may include one or more data storage media, devices, or configurations and may employ any type, form, and combination of data storage media and/or device. For example, storage device 1306 may include, but is not limited to, a hard drive, network drive, flash drive, magnetic disc, optical disc, RAM, dynamic RAM ("DRAM"), other non-volatile and/or volatile data storage units, or a combination or sub-combination thereof. Electronic data, including data described herein, may be temporarily and/or permanently stored in storage device 1306. For example, data representative of one or more executable applications 1312 configured to direct processor 1304 to perform any of the operations described herein may be stored within storage device 1306. In some examples, data may be arranged in one or more databases residing within storage device 1306.

I/O module 1308 may be configured to receive user input and provide user output and may include any hardware, firmware, software, or combination thereof supportive of input and output capabilities. For example, I/O module 1308 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1308 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1308 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1300. For example, one or more applications 1312 residing within storage device 1306 may be configured to direct processor 1304 to perform one or more processes or functions associated with providing facility 102, populating facility 104, and/or detection facility 106. Likewise, storage facility 108 may be implemented by or within storage device 1306.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   providing, by a computing system, a user interface to a user;
   populating, by the computing system, a listing accessible via the user interface with a set of graphical icons that represent a set of computing objects that are associated with a customer of a service provider and hosted by the service provider;
   detecting, by the computing system, a first selection by the user via the user interface of a plurality of graphical icons from the set of graphical icons populated within the listing;
   providing, by the computing system in response to the detecting of the first selection, a graphical representation of a plurality of relationships between the customer and each computing object within the set of computing objects represented by the plurality of selected graphical icons for presentation to the user via the user interface, the plurality of relationships including an ownership by the customer of a first computing object within the set of computing objects, a creation by the customer of a second computing object within the set of computing objects, and a utilization by the customer of a third computing object within the set of computing objects, and the graphical representation comprising:
   a graphical icon representative of the customer;
   the plurality of selected graphical icons representative of each computing object within the set of computing objects that are associated with the customer and hosted by the service provider;
   a plurality of edges between the graphical icon representative of the customer and the plurality of selected graphical icons representative of each computing object within the set of computing objects, the plurality of edges graphically representing the plurality of relationships between the customer and each computing object within the set of computing objects; and
   a plurality of labels that are presented in connection with the plurality of edges and that each graphically specify a respective relationship from the plurality of relationships between the customer and each computing object within the set of computing objects;
   detecting, by the computing system, a second selection by the user via the user interface of a graphical icon representative of a computing object within the set of computing objects, the selected graphical icon from the plurality of selected graphical icons presented in the graphical representation;
   displaying, by the computing system in response to the detecting of the second selection and within the graphical representation, a set of attributes of the computing object represented by the selected graphical icon.

2. The method of claim 1, wherein the set of computing objects comprise:
   one or more physical computing objects; and
   one or more logical computing objects.

3. The method of claim 2, wherein:
   the one or more physical computing objects comprise:
   a server,
   a cabinet, and
   a chassis; and
   the one or more logical computing objects comprise:
   an Internet Protocol (IP) network,
   a subnetwork, and
   a Virtual Local Area Network (VLAN).

4. The method of claim 1, further comprising:
   populating, by the computing system in response to the detecting of the second selection, another listing accessible via the user interface with another set of graphical icons that represent another set of computing objects that are associated with the computing object represented by the selected graphical icon.

5. The method of claim 4, further comprising:
   detecting, by the computing system, a third selection by the user via the user interface of one or more graphical icons from the other set of graphical icons populated within the other listing; and
   providing, by the computing system in response to the detecting of the third selection by the user, another graphical representation of one or more relationships between the computing object represented by the selected graphical icon and one or more of the other set of computing objects for presentation to the user via the user interface.

6. The method of claim 5, wherein the other graphical representation comprises:
   the graphical icon representative of the customer;
   the plurality of selected graphical icons representative of each computing object within the set of computing objects that are associated with the customer and hosted by the service provider;

the plurality of edges between the graphical icon representative of the customer and the plurality of selected graphical icons representative of each computing object within the set of computing objects, the plurality of edges graphically representing the plurality of relationships between the customer and each computing object within the set of computing objects;

the plurality of selected graphical icons from the other set of graphical icons; and one or more additional edges that graphically represent the one or more relationships between the computing object represented by the selected graphical icon and the one or more of the other set of computing objects represented by the one or more selected graphical icons from the other set of graphical icons.

7. The method of claim 6, wherein the other graphical representation further comprises one or more labels that are presented in connection with the one or more additional edges and graphically specify at least one type of relationship between the computing object represented by the selected graphical icon and the one or more of the other set of computing objects represented by the one or more selected graphical icons from the other set of graphical icons.

8. The method of claim 1, further comprising:
detecting, by the computing system, a request from the user via the user interface to modify at least one operation of the computing object represented by the graphical icon included in the one or more selected graphical icons presented in the graphical representation; and modifying, by the computing system, the at least one operation of the computing object in accordance with the request.

9. The method of claim 1, wherein the providing of the graphical representation of the plurality of relationships comprises providing, for presentation to the user via the user interface, a three-dimensional graphical representation of the plurality of relationships.

10. The method of claim 9, further comprising:
detecting, by the computing system, a request from the user via the user interface to pan or move a view of the three-dimensional graphical representation; and performing, by the computing system, a pan or move operation of the view of the three-dimensional graphical representation in accordance with the request.

11. The method of claim 1, embodied as computer-executable instructions on at least one non-transitory computer-readable medium.

12. The method of claim 1, wherein the set of attributes displayed within the graphical representation includes:
a date the computing object was deployed;
a date the computing object was last serviced;
a life expectancy of the computing object;
a load capacity of the computing object;
a location of the computing object;
a serial number of the computing object; and
a warranty expiration date of the computing object.

13. A method comprising:
providing, by a computing system, a user interface to a user;
identifying, by the computing system, a set of computing objects that are associated with a customer of a service provider and hosted by the service provider;
determining, by the computing system a plurality of relationships between the customer and each computing object in the set of computing objects, the plurality of relationships including an ownership by the customer of a first computing object within the set of computing objects, a creation by the customer of a second computing object within the set of computing objects, and a utilization by the customer of a third computing object within the set of computing objects; and providing, by the computing system, a graphical representation of the plurality of relationships between the customer and each computing object within the set of computing objects for presentation to the user via the user interface, wherein the graphical representation comprises:
a graphical icon representative of the customer;
a plurality of graphical icons representative of the set of computing objects; and
a plurality of edges between the graphical icon representative of the customer and the plurality of graphical icons representative of the set of computing objects, the plurality of edges graphically representing the plurality of relationships between the customer and each computing object within the set of computing objects;

detecting, by the computing system, a selection by the user via the user interface of a graphical icon representative of a computing object within the set of computing objects, the selected graphical icon from the plurality of selected graphical icons presented in the graphical representation;

displaying, by the computing system in response to the detection of the selection and within the graphical representation, a set of attributes of the computing object represented by the selected graphical icon.

14. The method of claim 13, wherein the set of attributes displayed within the graphical representation includes:
a date the computing object was deployed;
a date the computing object was last serviced;
a life expectancy of the computing object;
a load capacity of the computing object;
a location of the computing object;
a serial number of the computing object; and
a warranty expiration date of the computing object.

15. A system comprising:
at least one physical computing device that:
provides a user interface to a user;
populates a listing accessible via the user interface with a set of graphical icons that represent a set of computing objects that are associated with a customer of a service provider and hosted by the service provider;
detects a first selection by the user via the user interface of a plurality of graphical icons from the set of graphical icons populated within the listing;
provides, in response to the detecting of the first selection by the user, a graphical representation of a plurality of relationships between the customer and each computing object within the set of computing objects represented by the plurality of selected graphical icons for presentation to the user via the user interface, the plurality of relationships including an ownership by the customer of a first computing object within the set of computing objects, a creation by the customer of a second computing object within the set of computing objects, and a utilization by the customer of a third computing object within the set of computing objects, and the graphical representation comprising:

a graphical icon representative of the customer;

the plurality of selected graphical icons representative of each computing object within the set of computing objects that are associated with the customer and hosted by the service provider;

a plurality of edges between the graphical icon representative of the customer and the plurality of selected graphical icons representative of each computing object within the set of computing objects, the plurality of edges graphically representing the plurality of relationships between the customer and each computing object within the set of computing objects; and a plurality of labels that are presented in connection with the plurality of edges and that each graphically specify a respective relationship from the plurality of relationships between the customer and each computing object within the set of computing objects;

detects a second selection by the user via the user interface of a graphical icon representative of a computing object within the set of computing objects, the selected graphical icon from the plurality of selected graphical icons presented in the graphical representation;

displays, in response to the detection of the second selection and within the graphical representation, a set of attributes of the computing object represented by the selected graphical icon.

16. The system of claim 15, wherein the at least one physical computing device:

populates, in response to the detecting of the second selection, another listing accessible via the user interface with another set of graphical icons that represent another set of computing objects that are associated with the computing object represented by the selected graphical icon.

17. The system of claim 16, wherein the at least one physical computing device:

detects a third selection by the user via the user interface of one or more graphical icons from the other set of graphical icons populated within the other listing; and provides, in response to the detecting of the third selection, another graphical representation of one or more relationships between the computing object represented by the selected graphical icon and one or more of the other set of computing objects for presentation to the user via the user interface.

18. The system of claim 17, wherein the other graphical representation comprises:

the graphical icon representative of the customer;

the plurality of selected graphical icons representative of each computing object within the set of computing objects that are associated with the customer and hosted by the service provider;

the plurality of edges between the graphical icon representative of the customer and the plurality of selected graphical icons representative of each computing object within the set of computing objects, the plurality of edges graphically representing the plurality of relationships between the customer and each computing object within the set of computing objects;

the plurality of selected graphical icons from the other set of graphical icons; and one or more additional edges that graphically represent the one or more relationships between the computing object represented by the selected graphical icon and the one or more of the other set of computing objects represented by the one or more selected graphical icons from the other set of graphical icons.

19. The system of claim 18, wherein the other graphical representation further comprises one or more labels that are presented in connection with the one or more additional edges and graphically specify at least one type of relationship between the computing object represented by the selected graphical icon and the one or more of the other set of computing objects represented by the one or more selected graphical icons from the other set of graphical icons.

20. The system of claim 15, wherein the set of attributes displayed within the graphical representation includes:

a date the computing object was deployed;

a date the computing object was last serviced;

a life expectancy of the computing object;

a load capacity of the computing object;

a location of the computing object;

a serial number of the computing object; and a warranty expiration date of the computing object.

* * * * *